DICKERSON & WARREN'S
Improvement in Machines for Cutting Solid Leather Belting.

No. 120,948.   Patented Nov. 14, 1871.

WITNESSES:  
Daniel M. Lefever  
Francis B. Dangerfield

INVENTORS.  
Theodore J. Dickerson  
Oliver B. Warren

UNITED STATES PATENT OFFICE.

THEODORE J. DICKERSON AND OLIVER B. WARREN, OF AUBURN, NEW YORK.

IMPROVEMENT IN MACHINES FOR CUTTING SOLID LEATHER BELTING.

Specification forming part of Letters Patent No. 120,948, dated November 14, 1871.

*To all whom it may concern:*

Be it known that we, THEODORE J. DICKERSON and OLIVER B. WARREN, both of the city of Auburn, Cayuga county, and State of New York, have invented a Machine for the Manufacture of Solid Leather Belting and other purposes, of which the following is a specification:

Our invention relates to the combination of rotary feeding or drawing rolls of rubber or other suitable material with a divided die or cutter. Each part of said die or cutter is made adjustable, and constructed in such a manner that when adjusted to its proper position the points or cutting extremities are in contact, while the heels are separated sufficient to avoid friction between the die and the material passing through it, except at the cutting point. The object of this part of our invention is to provide a means for cutting leather or other material with economy as to power and time, and to deliver it in the required form, not distorted by the greater strain that would be required to feed the material if it were in contact throughout the entire length of the die; also, to provide an easy means of sharpening the die or cutter without altering its section. Our invention also relates to the placing at or upon the cutting extremity of said divided die or cutter a cap or guide. The object of this part of our invention is to provide a means for the easy and speedy adjustment of the parts of the divided die or cutter, and also to correct the tendency of the material to sheer and cut off.

Figure 1:
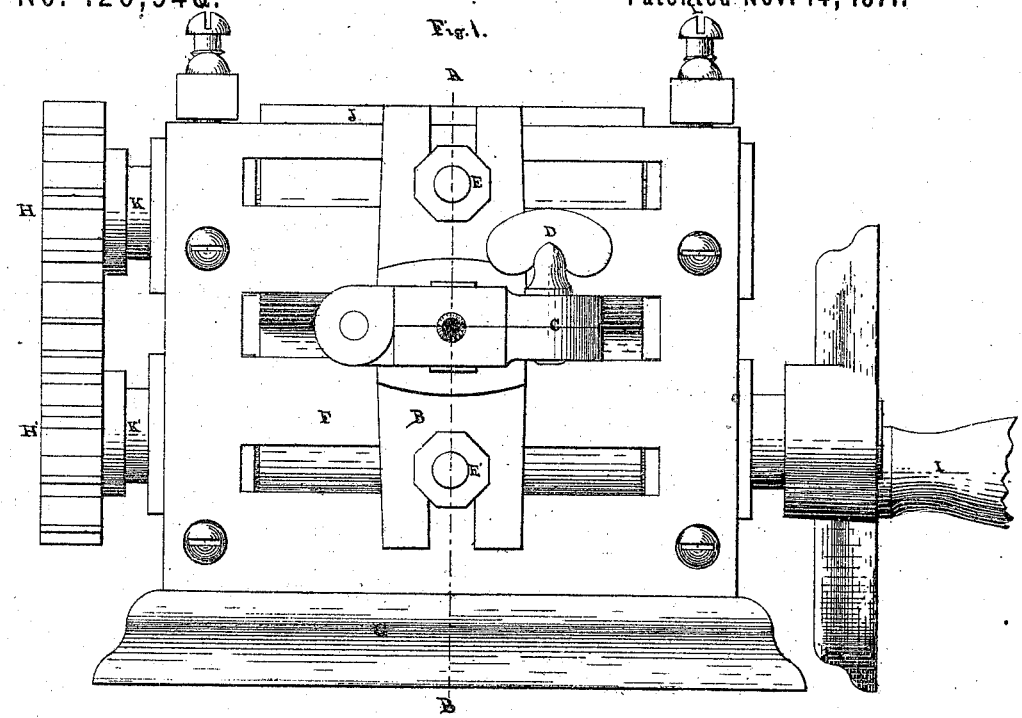
Figure 2:
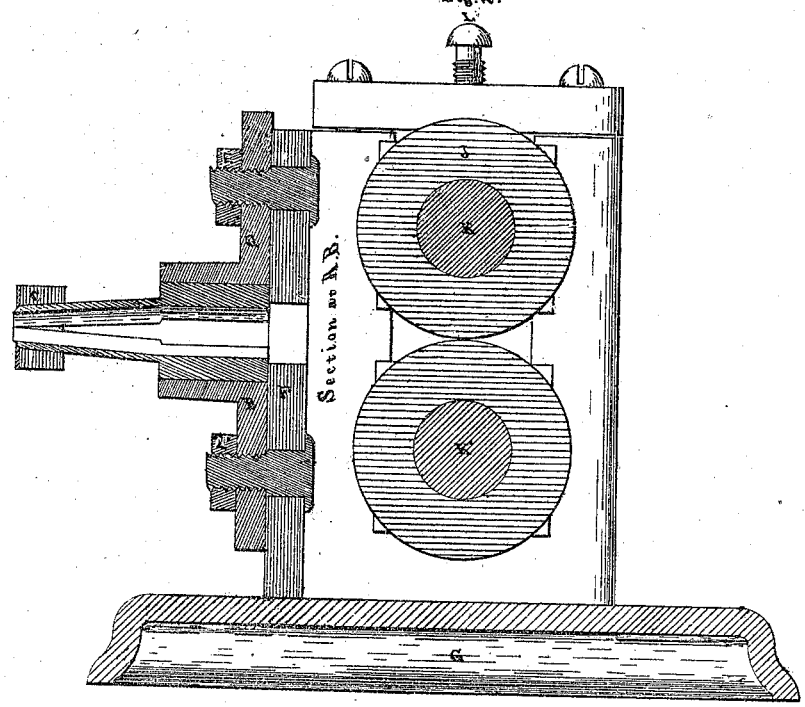

Figure 1 is a front elevation of a machine embodying our invention. Fig. 2 is a vertical transverse section, showing the same machine.

G is the frame of the machine. I is a crank keyed upon the extremity of the shaft K. K K' are the shafts of two rollers, J J', to which coincident motion is imparted by means of the crank I and toothed wheels H H'. A and B are, respectively, the upper and lower parts of the divided die or cutter, (in this case each part is constructed of two pieces, but may be made solid,) secured to the slotted plate F by bolts E E'. C is the cap on the die or cutter, secured in its proper position by the clamp-screw D, or may be secured by continuing the extremities of said cap D, and slipping a ring or link over those extremities.

The part A of the divided die or cutter having been loosened, the material to be cut is introduced between the upper and lower parts of the divided die or cutter A B and the end drawn between the rolls J' J. The upper part of the die or cutter A being now brought down onto the material and partially secured by the bolt E, the cap or guide C is placed over both parts of the divided die or cutter A B, and by the pressure caused by turning the clamp-screw D the material is compressed and the parts of the die or cutter A B adjusted to their proper position. Motion being now imparted to the rolls J J' by means of the crank I, or a belt and pulley, the material is drawn through the die or cutter A B, all friction being avoided after passing the cutting point by adjusting the die or cutter A B in such a manner that its rear extremity is separated, such adjustment and construction permitting the die or cutter A B to be reground or sharpened without altering its section.

We claim as our invention—

1. In a machine for cutting solid leather belting, the divided cutters A B, constructed and operating as and for the purpose described.

2. In combination with the cutters A B, the cap C, as and for the purpose described.

THEODORE J. DICKERSON.
OLIVER B. WARREN.

Witnesses:
FRANCIS S. DANGERFIELD,
DANIEL M. LEFEVER. (81)